Patented Nov. 27, 1945

2,390,037

UNITED STATES PATENT OFFICE 2,390,037

TRANSDITHIOCYANOETHYLENE AS A FUNGICIDE

Kenneth G. Nolan, Stamford, Conn., assignor to American Cyanamid Company, New York, N. Y., a corporation of Maine No Drawing. Application December 29, 1942, Serial No. 470,495

2 Claims. (Cl. 167—38)

The present invention relates to a seed disinfectant, and more particularly to an organic compound which is highly effective in controlling diseases of seed grain.

I have discovered that 1,2-dithiocyanoethylene is an effective agent for the protection of seeds and seedlings from seed-borne and soil-borne organisms which cause seed rot, seedling blight and damping-off. It has been found particularly effective in controlling such systemic organisms as bunt of wheat and smut of oats.

The above compound may be prepared as follows: .1 mol equivalent of lead thiocyanate in 100 cc. of benzene is treated with .1 mol equivalent of bromine at 10–20° C. The mixture is agitated until the color of the bromine disappears, and then filtered to remove the lead bromide. The benzene solution of thiocyanogen is irradiated with ultra violet light while acetylene is passed in for about 1 hour. After heating under reflux on a steam bath for one hour the solution is filtered, and the filtrate partially evaporated and cooled. The product separates as light yellow crystals melting at 97–98° C.

A dust consisting of equal parts of 1,2-dithiocyanoethylene and talc was found well adapted for the treatment of heavily smutted oat seed in the proportion of two ounces of dust to a bushel of the grain.

A highly effective control of bunt of spring wheat was obtained using a dust consisting of equal parts of 1,2-dithiocyanoethylene and talc applied in the proportion of one ounce of dust per bushel of wheat.

Seed corn highly infected with *Diplodia zeae* was dusted with a mixture consisting of equal parts of 1,2-dithiocyanoethylene and talc in the proportion of 1.5 ounces of dust per bushel of corn. Excellent control of the root rot organism was obtained.

Other seed diseases which may be readily controlled by 1,2-dithiocyanoethylene include stripe of barley, covered smut of barley, Gibberella seedling blight and Helminthosporium seedling blight of small grains.

Although the above compound may be used alone as a seed disinfectant, it is usually preferable to mix it with inert fillers or spreading materials such as talc, bentonite, fuller's earth, pumice, silica, silicates, chalk and the like. The proportion of the seed disinfectant to the inert material in the prepared dust may be varied in accordance with the particular effects desired and the conditions under which it is to be used. Under some circumstances, it may be desirable and feasible to apply the present compound in the form of a solution or suspension in a liquid, and the present invention does not preclude such use.

While the invention has been described with particular reference to specific embodiments, it is to be understood that it is not to be limited thereto, but is to be construed broadly and restricted solely by the scope of the appended claims.

What is claimed is:

1. A method of controlling organisms carried by seeds which includes applying thereto a toxic quantity of 1,2-dithiocyanoethylene.

2. A composition for disinfecting seeds comprising substantially equal parts of 1,2-dithiocyanoethylene and an inert material.

KENNETH G. NOLAN.